United States Patent
Kim

(10) Patent No.: US 12,333,111 B2
(45) Date of Patent: Jun. 17, 2025

(54) ELECTRONIC APPARATUS HAVING A SENSING UNIT TO INPUT A USER COMMAND AND A METHOD THEREOF

(71) Applicant: Seungman Kim, McLean, VA (US)

(72) Inventor: Seungman Kim, McLean, VA (US)

( * ) Notice: Subject to any disclaimer, the term of this patent is extended or adjusted under 35 U.S.C. 154(b) by 0 days.

(21) Appl. No.: 18/435,179

(22) Filed: Feb. 7, 2024

(65) Prior Publication Data

US 2024/0192803 A1 Jun. 13, 2024

Related U.S. Application Data

(60) Division of application No. 18/141,373, filed on Apr. 29, 2023, now Pat. No. 11,928,286, which is a continuation of application No. 17/404,381, filed on Aug. 17, 2021, now Pat. No. 11,675,457, which is a continuation of application No. 17/071,042, filed on Oct. 15, 2020, now Pat. No. 11,182,021, which is a continuation of application No. 16/528,695, filed on Aug. 1, 2019, now Pat. No. 10,845,922, which is a continuation of application No. 15/875,367, filed on Jan. 19, 2018, now Pat. No. 10,423,284, which is a continuation of application No. 15/440,033, filed on Feb. 23, 2017, now Pat. No. 10,013,115, which is a continuation of application No. 15/246,302, filed on (Continued)

(51) Int. Cl.
| | |
|---|---|
| G06F 3/041 | (2006.01) |
| G02B 13/00 | (2006.01) |
| G06F 3/01 | (2006.01) |
| G06F 3/03 | (2006.01) |
| G06F 3/042 | (2006.01) |
| G06F 3/04817 | (2022.01) |
| G06F 3/0482 | (2013.01) |
| G06F 3/04883 | (2022.01) |

(52) U.S. Cl.
CPC .......... *G06F 3/0418* (2013.01); *G02B 13/00* (2013.01); *G06F 3/011* (2013.01); *G06F 3/017* (2013.01); *G06F 3/0304* (2013.01); *G06F 3/0425* (2013.01); *G06F 3/04817* (2013.01); *G06F 3/0482* (2013.01); *G06F 3/04883* (2013.01)

(58) Field of Classification Search
CPC ........ G06F 3/0418; G06F 3/011; G06F 3/017; G06F 3/0304; G06F 3/0425; G06F 3/04817; G06F 3/0482; G06F 3/04883; G02B 13/00
USPC ....................................................... 345/173
See application file for complete search history.

(56) References Cited

U.S. PATENT DOCUMENTS

| | | | |
|---|---|---|---|
| 8,233,789 B2 | 7/2012 | Brunner | |
| 8,345,129 B2 * | 1/2013 | Kanade .................. | H04N 7/144 702/182 |

(Continued)

OTHER PUBLICATIONS

Web: https://support.apple.com/en-us/HT204380, Apple, iOS7, Face Time, 7 pages.

*Primary Examiner* — Tom V Sheng
(74) *Attorney, Agent, or Firm* — Seungman Kim; EIPG

(57) ABSTRACT

A panel is usable with a cell phone having a housing, a network interface, a user interface, and a camera. The panel includes a display panel having light elements to display an image, and a touch panel disposed on the display panel to receive a touch input, the panel having a first portion and a second portion, the second portion being in the first portion and having a transparent condition. The camera of the cell phone is in the second portion of the panel.

36 Claims, 15 Drawing Sheets

Related U.S. Application Data

Aug. 24, 2016, now Pat. No. 9,864,511, which is a continuation of application No. 14/583,537, filed on Dec. 26, 2014, now Pat. No. 9,454,235.

(56) References Cited

U.S. PATENT DOCUMENTS

| | | |
|---|---|---|
| 8,515,128 B1 | 8/2013 | Heldreth |
| 8,600,120 B2 | 12/2013 | Gonion et al. |
| 8,686,943 B1 | 4/2014 | Rafii |
| 8,723,789 B1 | 5/2014 | Rafii |
| 8,830,208 B2 | 9/2014 | Sohn |
| 9,075,514 B1 | 7/2015 | Karakotsios |
| 9,076,029 B2 | 7/2015 | Free |
| 10,528,145 B1 | 1/2020 | Zhang |
| 2004/0189720 A1 | 9/2004 | Wilson |
| 2004/0193413 A1 | 9/2004 | Wilson |
| 2005/0122308 A1* | 6/2005 | Bell .................. G06V 10/145 345/156 |
| 2006/0289760 A1 | 12/2006 | Bathche |
| 2009/0109178 A1 | 4/2009 | Kim |
| 2010/0066667 A1 | 3/2010 | MacDougall et al. |
| 2010/0134409 A1 | 6/2010 | Challener |
| 2011/0141009 A1 | 6/2011 | Izumi |
| 2012/0019485 A1 | 1/2012 | Sato |
| 2012/0081392 A1 | 4/2012 | Arthur |
| 2012/0127084 A1* | 5/2012 | Large .................. G06F 3/0416 345/173 |
| 2012/0270653 A1 | 10/2012 | Kareem |
| 2012/0306738 A1 | 12/2012 | Yamashita |
| 2012/0314899 A1 | 12/2012 | Cohen |
| 2013/0009863 A1 | 1/2013 | Noda |
| 2013/0009956 A1 | 1/2013 | Noda |
| 2013/0088429 A1 | 4/2013 | Yang |
| 2013/0202161 A1 | 8/2013 | Shor et al. |
| 2013/0212515 A1 | 8/2013 | Eleftheriou |
| 2014/0062851 A1 | 3/2014 | Venon |
| 2014/0104164 A1 | 4/2014 | Chen |
| 2014/0118270 A1 | 5/2014 | Moses et al. |
| 2014/0232695 A1* | 8/2014 | McGaughan ......... G06F 3/0426 345/175 |
| 2015/0057082 A1 | 2/2015 | Kareem |
| 2015/0058811 A1 | 2/2015 | Tsou |
| 2015/0085063 A1 | 3/2015 | Fish |
| 2015/0138073 A1 | 5/2015 | Hennelly |
| 2015/0153902 A1 | 6/2015 | Suzuki |
| 2015/0253931 A1 | 9/2015 | Wyrwas |
| 2015/0261374 A1 | 9/2015 | Eguchi et al. |
| 2015/0271392 A1* | 9/2015 | Musgrave ........... G09G 3/3406 348/207.11 |
| 2016/0337570 A1* | 11/2016 | Tan ......................... G06F 3/01 |

\* cited by examiner

ELECTRONIC APPARATUS HAVING A SENSING UNIT TO INPUT A USER COMMAND AND A METHOD THEREOF

CROSS-REFERENCE TO RELATED APPLICATION

This application is a Divisional Application, under 35 U.S.C. § 120, of a Continuation application Ser. No. 18/141,373, filed on Apr. 29, 2023, of a Continuation application Ser. No. 17/404,381, filed on Aug. 17, 2021, now U.S. Pat. No. 11,675,457, which is a Continuation application Ser. No. 17/071,042, filed on Oct. 15, 2020, now U.S. Pat. No. 11,182,021, which is a Continuation application Ser. No. 16/528,695, filed on Aug. 1, 2019, now U.S. Pat. No. 10,845,922, which is a Continuation application Ser. No. 15/875,367, filed on Jan. 19, 2018, now U.S. Pat. No. 10,423,284, which is a Continuation application Ser. No. 15/440,033, filed on Feb. 23, 2017, now U.S. Pat. No. 10,013,115, which is a Continuation application Ser. No. 15/246,302, filed on Aug. 24, 2016, now U.S. Pat. No. 9,864,511, which is a Continuation Application of a U.S. Non-Provisional application Ser. No. 14/583,537, filed on Dec. 26, 2014, now U.S. Pat. No. 9,454,235, in the United States Patent and Trademark Office, the contents of which are incorporated herein in their entirety by reference.

BACKGROUND OF THE INVENTIVE CONCEPT

1. Field of the Inventive Concept

The present inventive concept relates to an electronic apparatus and method of inputting a user command through a sensing unit thereof.

2. Description of the Related Art

A conventional electronic mobile device, for example, a cellular phone, includes a camera and a display unit having a display area to display an image photographed by the camera. However, a center line of the camera does not correspond to a center line of the display area. Therefore, when an object is disposed over a position of the center line of the display area, an image of the object is displayed on a position different from the center line of the display area of the display unit.

When a user intends to place an object on a position to be disposed over the display area to correspond to a position of the display area in a vertical direction relationship between the position of the object and the position of the display area, an image of the object displayed on the display area is deviated from the intended position.

When a user intends to move an object between positions to be disposed over the display area to correspond to positions of the display area in a vertical direction relationship between the positions of the object and the positions of the display area, an image of the object displayed on the display area is deviated from the intended positions.

Since a position of an object is sensed to be different from a position of a display area, it is difficult to sense a position of an object sensed by a camera to correspond to a position of a point of a display area.

SUMMARY OF THE INVENTIVE CONCEPT

The present inventive concept provides a panel usable with a cell phone having a housing, a network interface, and a user interface, the panel including a display panel comprising light elements to display an image, and a touch panel disposed on the display panel to receive a touch input, wherein the panel comprises a first portion and a second portion, the second portion being in the first portion and having a transparent condition such that a camera of the cell phone is in the second portion.

The present inventive concept provides a cell phone including a housing, a network interface, a user interface having a panel having a display panel comprising light elements to display an image, and a touch panel disposed on the display panel to receive a touch input, wherein the panel includes a first portion and a second portion, the second portion being in the first portion and having a transparent condition, and a camera being in the second portion to photograph an object over the panel through the second portion.

The present inventive concept provides a method of a cell phone including a housing, a network interface, a user interface having a panel having a display panel comprising light elements to display an image, and a touch panel disposed on the display panel to receive a touch input, wherein the panel includes a first portion and a second portion, the second portion being in the first portion and having a transparent condition, and a camera being in the second portion to photograph an object over the panel through the second portion.

The present inventive concept provides a computer readable medium to contain computer readable codes as a program to execute a method of a cell phone including a housing, a network interface, a user interface having a panel having a display panel comprising light elements to display an image, and a touch panel disposed on the display panel to receive a touch input, wherein the panel includes a first portion and a second portion, the second portion being in the first portion and having a transparent condition, and a camera being in the second portion to photograph an object over the panel through the second portion.

Additional features and utilities of the present inventive concept will be set forth in part in the description, which follows and, in part, will be obvious from the description, or may be learned by practice of the present inventive concept.

The foregoing and/or other features and utilities of the present inventive concept may be achieved by providing a panel usable with a cell phone having a housing, a network interface, and a user interface, the panel including a display panel comprising light elements to display an image, and a touch panel disposed on the display panel to receive a touch input, wherein the panel includes a first portion and a second portion, the second portion being in the first portion and having a transparent condition such that a camera of the cell phone is in the second portion.

The second portion may be formed in the display panel.

The first portion and the second portion may be parallel to each other within the panel.

The second portion may be formed in the first portion in a thickness direction of the panel.

The second portion may be smaller than the first portion with respect to a display area of the panel.

The second portion may be surrounded by the first portion.

The camera of the cell phone may include a lens, and the lens may not be outside the second portion.

The camera of the cell phone may not be outside the second portion.

The first portion may include the light elements, and the second portion may not include the light elements.

The first portion may include a liquid crystal device.

The first portion may include a light emitting device.

The first portion may include a first number of light elements, and the second portion may include a second number of light elements.

The first portion may include a circuit element and a light element.

The transparent condition may further include an interference-prevention condition to prevent the camera of the cell phone from being interfered during photographing.

The transparent condition may prevent the camera of the cell phone from being interfered during sensing.

The foregoing and/or other features and utilities of the present inventive concept may also be achieved by providing a cell phone including a housing, a network interface, a user interface including a panel comprising a display panel comprising light elements to display an image, and a touch panel disposed on the display panel to receive a touch input, wherein the panel includes a first portion and a second portion, the second portion being in the first portion and having a transparent condition, and a camera being in the second portion to photograph an object over the panel through the second portion.

The cell phone may further include a control unit to control the network interface and the user interface, and to control the cameras to perform a photographing mode to photograph the object. The photographed object may be displayed on the panel.

The cell phone may further include a control unit to control the network interface and the user interface, and to control the camera to perform a sensing mode to sense the object. The sensed object may not be displayed on the panel.

The second portion may be formed in the display panel.

The first portion and the second portion may be parallel to each other within the panel.

The second portion may be formed in the first portion in a thickness direction of the panel.

The second portion may be smaller than the first portion with respect to a display area of the panel.

The second portion may be surrounded by the first portion.

The camera may include a lens, and the lens may not be outside the second portion.

The camera may not be outside the second portion.

The camera may be at a bottom of the second portion of the panel.

The first portion may include the light elements, and the second portion may not include the light elements.

The first portion may include a liquid crystal device.

The first portion may include a light emitting device.

The first portion may include a first number of light elements, and the second portion may include a second number of light elements.

The first portion may include a circuit element and a light element.

The transparent condition may further include an interference-prevention condition to prevent the camera from being interfered during photographing the object.

The transparent condition may prevent the camera from being interfered during sensing the object.

The camera may include one or more cameras in the second portion of the panel.

The camera may include one or more cameras in the second portion of the panel, and a control unit may selectively control the one or more cameras to perform a photographing mode and a sensing mode.

BRIEF DESCRIPTION OF THE DRAWINGS

These and/or other features and utilities of the present general inventive concept will become apparent and more readily appreciated from the following description of the exemplary embodiments, taken in conjunction with the accompanying drawings of which.

DETAILED DESCRIPTION OF THE EXEMPLARY EMBODIMENTS

Figure 1:
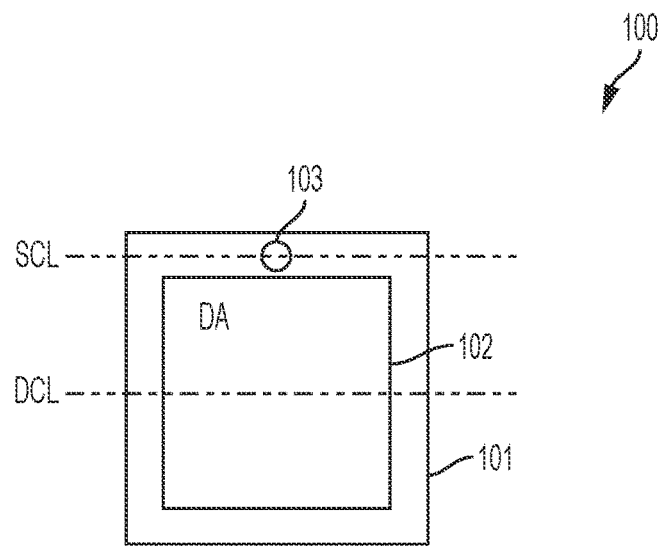
FIG. 1 is a diagram illustrating an electronic apparatus according to an embodiment of the present inventive concept.

Reference will now be made in detail to exemplary embodiments of the present general inventive concept, examples of which are illustrated in the accompanying drawings, wherein like reference numerals refer to the like elements throughout. The exemplary embodiments are described below in order to explain the present general inventive concept while referring to the figures.

FIG. 1 is a diagram illustrating an electronic apparatus 100 according to an embodiment of the present inventive concept. The electronic apparatus 100 may be a mobile device having one or more camera units to photograph an object disposed in a front side and/or a back side of the mobile device. The electronic apparatus 100 includes a housing 101, a display unit 102 disposed on the housing 101 to display an image on a display area DA having a display center line DCL, and a sensing unit 103 having a sensing element to sense an object disposed around the electronic apparatus 100.

The sensing unit 103 may include the one or more camera units having a sensing center line SCL to generate an image corresponding to the photographed object with respect to the display area DA. The sensing center line SCL and the display center line DCL are spaced apart from each other. Although the sensing center line SCL is illustrated in a left-right direction of FIG. 1, the sensing center line SCL may be disposed at a line perpendicular to a surface of the housing 101, for example, the display area DA. Although the display center line DCL is illustrated in a left-right direction of FIG. 1, the display center line DCL may be disposed at a line perpendicular to a surface of the housing 101, for example, the display area DA.

As an example, when the sensing unit is a camera to photograph an object, and the display area DA displays an image corresponding to the photographed object, a center of the displayed image of the photographed object may be not identical to a center of the photographed object due to a distance between the sensing center line SAC and the display center line DCL. When an object approaches toward a portion of the display area DA in a direction perpendicular to a surface of the display area DA, the image of the photographed object is not displayed to move toward the portion of the display area DA in a direction perpendicular to a surface of the display area DA. As another example, when an object moves toward or disposed at a center of the display area DA, the image of the photographed object is not displayed at the center of the display area DA but is displayed at another portion spaced apart from the center of the display area DA.

When a user is disposed in front of the electronic apparatus to face the display area DA and a user finger or tool is disposed over or moves toward a point of the display area DA, a photographed image of the user finger or tool is displayed on the display area DA differently as if the user finger or tool is disposed over or moves toward another point of the display area DA. The photographed position (location) or movement of the user finger or tool may be referred to a virtual position (location) or movement of the object, and the position (location) or movement of the object with respect to the display area DA may be referred to an actual or physical position (location) or movement of the object. The virtual position or movement of the object in the photographed or sensed image with respect to the display area DA may be different from the actual position or movement with respect to the display area DA. Therefore, the electronic apparatus may not determine or recognize the status of the object as a user input according to the virtual position or movement in the photographed or sensed image but may generate an error in determining or recognizing the virtual position of movement of the object as a user input with respect to the display area DA. Accordingly, the virtual position (location) or movement of the photographed image of the object may be modified or corrected to the actual or physical position (location) or movement such that the status of the object can be determined as a user input with respect to a point of the display area DA. This modification or correction allows the electronic apparatus to determine or recognize a user input from the physical location or movement of the object with respect to the display area DA.

Figure 2:
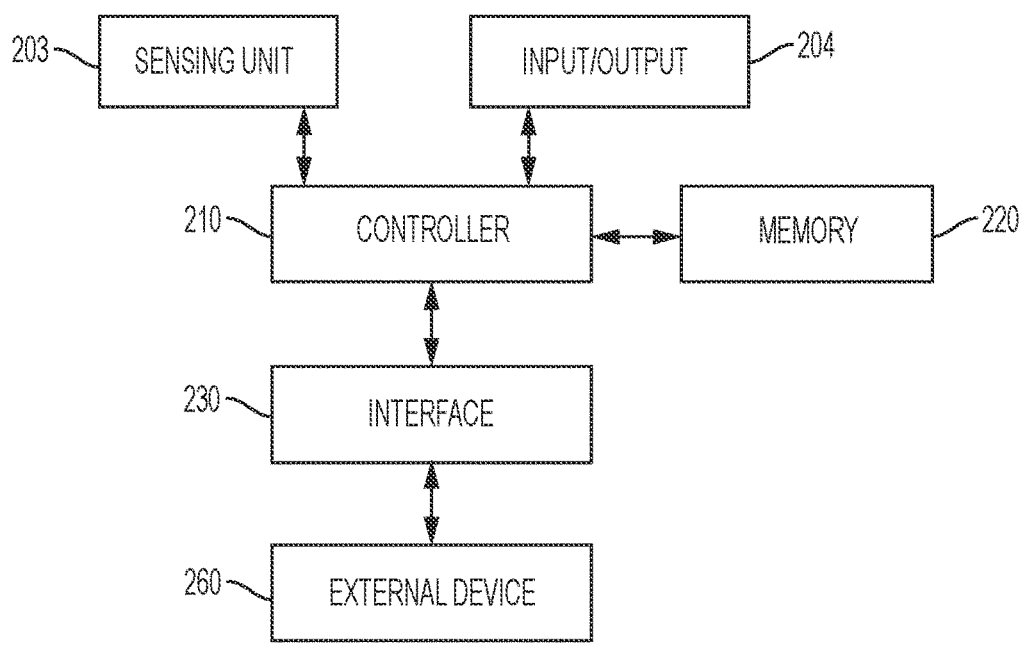
FIG. 2 is a block diagram illustrating an electronic apparatus according to an embodiment of the present inventive concept.

FIG. 2 is a block diagram illustrating an electronic apparatus 200 according to an embodiment of the present inventive concept. The electronic apparatus 200 may be the electronic apparatus 100.

The electronic apparatus 200 includes a controller 210, a memory unit 220, an interface 230, a sensing unit 203, and an input/output unit 204. The controller 210, the memory 220, the interface 230, the sensing unit 203 and the input/output unit 204 may be included in a single housing. However, it is possible that at least one of the memory 220, the interface 230, the sensing unit 203 and the input/output unit 204 may be connected to the housing. The sensing unit 203 may correspond to the sensing unit 103 of FIG. 1, and the input/output unit 204 may correspond to the display unit 102 of FIG. 1. The memory unit 220 may store data usable to perform functions of the electronic apparatus 200. The memory unit 220 may be a semiconductor memory device, a read-only memory (ROM), a random-access memory (RAM), a flash memory, a semiconductor chip package, CD-ROMs, magnetic tapes, floppy disks, and optical data storage devices. The input/output unit 204 may be a display device to display an image or a touch panel to receive a user input. The input/output unit 204 may include an audio element to generate an audio signal alone or together with an image displayed on a display unit according to a user input or data processed in the controller 210.

The sensing unit 203 may include one or more cameras to photograph an object and/or a sensing element to sense an object disposed over a display area of the display device or touch panel. The photographed or sensed object may be displayed as an image on the display area DA. However, it is possible that the photographed or sensed object may not be displayed as an image but may be usable as a user input (command or data) to correspond to a portion (icon or menu) of the display area DA. It is also possible that the photographed or sensed object may not be displayed as an image of the photographed object but may be displayed as a symbol representing the photographed or sensed object with respect to the display area DA. That is, when the sensing unit 203 is in a camera mode, the photographed object is displayed as an image on the display area DA. When the sensing unit 203 is in a sensing mode, the sensed object is usable as a user input (or user data input) to correspond to a portion (icon or menu selection or a user command) of the display area DA. It is also possible that in a combination mode, the photographed object is displayed on the display area DA, the icon or menu is displayed on the display area DA, and the photographed (or sensed) object is used as a user input to control or perform a function of the icon (or menu) of the display area or to control the displayed image or to control the sensing unit 203. The camera mode, the sensing mode, and the combination mode can be selected in a menu screen of the display area DA or can be selected according to a selection of a button corresponding to the respective mode according to a user input.

The input/output unit 204 may be a display unit to display an image, and/or an input unit to input a user input (command or data). The input/output unit 204 may have a display area DA of a screen (panel) to display an image photographed by a camera, to display a menu icon, to receive a user touch as a user input through the displayed menu icon, and to display an image sensed by the sensing element. The panel may be a touch panel. The touch panel is well known, detail descriptions thereof are omitted. The input/output unit 204 may separately or independently generate or receive the photographed image, the displayed menu icon, the received user input, and the sensed image in corresponding modes according to a user design or preference. It is possible that the input/output unit 204 may simultaneously generate or receive the photographed image, the displayed menu icon, the received user input, and the sensed image in corresponding modes according to a user design or preference. It is also possible that the input/output unit 204 may generate a combination of the photographed image, the displayed menu icon, the received user input, and the sensed image according to a user design or preference.

The controller 210 may generate a menu option to be displayed on the display area DA. The menu option may include a first menu option to select a camera mode in which a camera photographs an object and generates the photographed image to be displayed on the display area DA, a sensing mode in which a sensing unit senses an object disposed over the display area DA and generates the sensed image corresponding to the sensed object to be displayed on the display area DA, and a combination mode in which a camera is usable as a camera and a sensing element to perform both functions of the camera and the sensing element. Here, the photographed image is an image photographed by a camera and the sensed image is a symbol of the sensed object. Therefore, when one or more objects are photographed, the photographed objects are displayed on the display area DA, and at least one of the photographed objects may be sensed as the sensed image to be displayed as a symbol representing at least a portion of the one object. The photographed image and the sensed image may overlap on the display area DA. And also the menu icon and the sensed image may overlap on the display area DA. The sensed image may be useable as a user input corresponding to a menu icon displayed on the display area DA of the screen so that the controller 210 can determine that a menu icon is selected according to a location of the sensed image and can perform a function of the menu icon corresponding to the sensed image.

The controller 210 may receive the photographed (or sensed) object from the sensing unit 203 and generate an image corresponding to the photographed object to be displayed on the display area. Here, it is possible that the controller 210 controls or modifies the image to display a portion of the photographed object which is disposed above the display area DA in a direction, for example, in a direction perpendicular to the display area DA such that a center line of the displayed portion of the photographed object is identical to the center DCL of the display area DA or such that an area of the display portion of the photographed object is identical to the display area DA. The sensing unit 203 may perform at least a portion of the above-described function of the controller 210. According to status of the photographed or sensed object, the controller may receive a user input or command to perform a function including, but not limited to, a drag operation, a selecting operation, a data input operation, a displayed image modification operation, an communication method selecting operation, a data transmission or reception method selecting method, an external device selecting operation, an access point selecting operation, and so on. The status of the object may be a stationary or a motion between two positions in a virtual area VA of the sensing unit 203 with respect to the display area DA of the input/output unit 204.

As stated above, due to different center lines of the display area DA and the sensing unit 203, a location or movement of the photographed object with respect to the display area DA is displayed at a different location or movement within the display area DA. When an object is disposed at a position over a center of the display area DA in a direction perpendicular to the display area DA, the photographed object is displayed at a different position from the center of the display area DA. However, the photographed object disposed at a position over a center of the display area DA in the perpendicular direction may be displayed at the center of the display area DA by analyzing and modifying a photographed object image. The controller 210 may control, adjust, or modify a location or movement of an object photographed with respect to the sensing unit 203 to correspond to a location and a movement with respect to display area DA. In this case, an object disposed at another portion which is not in an area corresponding to the display area DA in the perpendicular direction may not be displayed in the display area. An object disposed in an area corresponding to the display area DA in the perpendicular direction may be displayed in the display area. The sensing unit 203 may perform at least a portion of the above-described function of the controller 210.

The controller 210 may include a look-up table usable to analyze a first state of the object in the photographed or sensed object in the virtual area VA and to convert (correct or modify) the first state of the object into a second state of the object with respect to the display screen DA as the status of the object. The look-up table may include information on coordinates of the virtual area VA and the display screen and information on a virtual location (or movement) of the object in the photographed or sensed image in the virtual area VA and an actual or physical location (or movement) of the object with respect to the display area DA. When the object is disposed or moved in the virtual area VA, the sensing unit 203 photographs the object to generate the photographed or sensed image of the object with respect to the coordinate of the virtual area VA. And then a location or movement of the photographed or sensed image of the object is analyzed and modified to a different location or movement with respect to the coordinate of the display screen. Since the coordinates of the virtual area VA and the display area DA are same, the object is represented in the coordinate of the display area DA at a different location or movement from the location or movement in the virtual area VA. Although the coordinates of the virtual area VA and the display area DA are same, the virtual location or movement of the object photographed or sensed with respect to the virtual area VA may be different from the actual or physical location or movement of the object with respect to the display area DA according to a distance between the sensing center line SCL of the sensing unit 203 and the display center line SCL of the input/output unit 204 or according to a distance from the sensing center line SCL to the location of the object in the virtual area VA.

The interface 230 communicates with an external device 260 using a wired or wireless communication method to transmit data to the external device 260 and to receive data from the external device 260 according to a user input. The controller 210 controls the above described units and elements of the electronic apparatus 200. The controller 210 may include one or more semiconductor processors to perform functions of the electronic apparatus 200.

Figure 3:
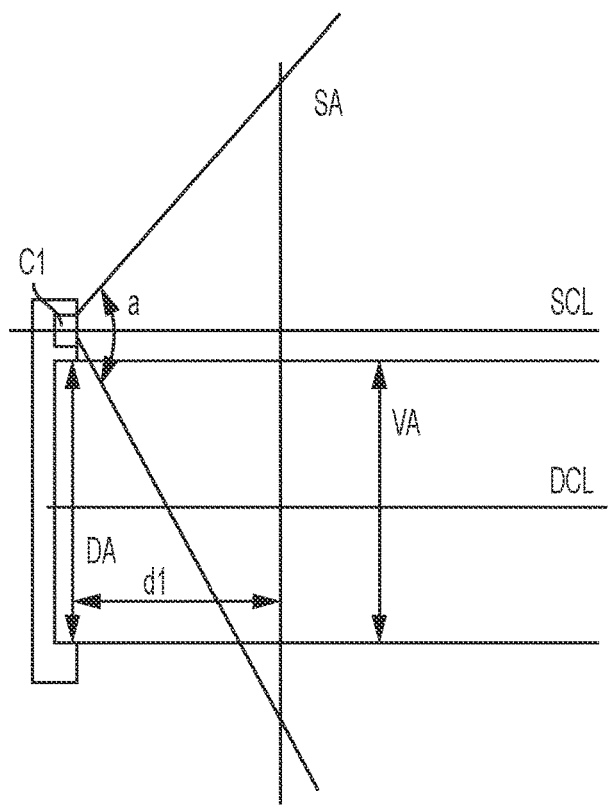
FIGS. 3 and 4 are views illustrating a sensing unit and a display screen in an electronic apparatus according to an embodiment of the present general inventive concept.

FIG. 3 is a view illustrating a sensing area SA and a display area DA in an electronic apparatus according to an embodiment of the present general inventive concept. A camera (or sensing element) C1 as the sensing unit 203 of FIG. 2 photographs an object in the sensing area SA having a photographing angle "a" and a sensing center line SCL. A virtual area VA is disposed in the sensing area SA to correspond to the display area DA in a direction perpendicular to the display area DA. The sensing center line SCL of the camera C1 may be parallel to a display center line DCL of the display area DA. It is possible that sensing center line SCL of the camera C1 may not be parallel to a display center line DCL of the display area DA to control or adjust a distance d1 which is a distance between the display area DA and a boundary of a virtual plane VP or a boundary SAb of the sensing area SA. The distance D1 may be adjustable when the camera C1 is adjustably installed in the housing 101 of FIG. 1 to change the sensing center line SCL.

Figure 4:
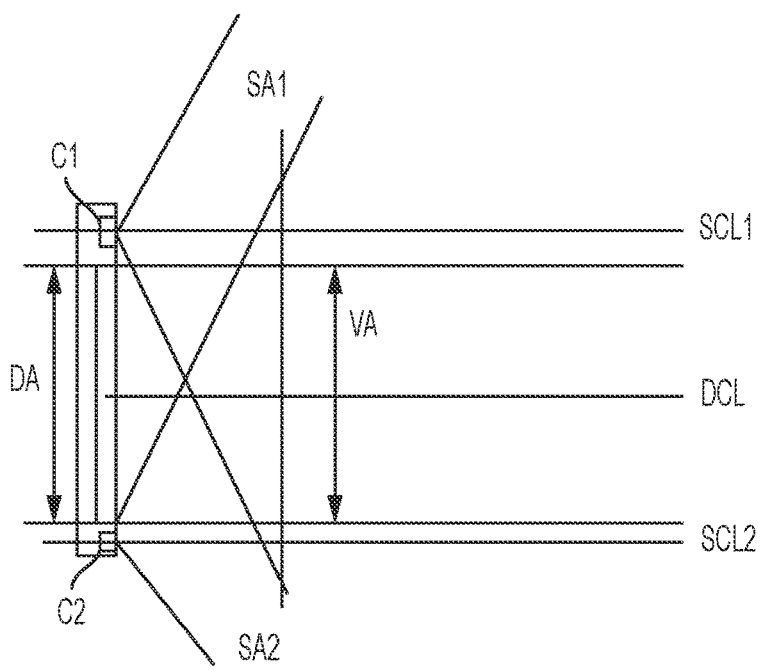

FIG. 4 is a view illustrating a sensing unit and a display screen in an electronic apparatus according to an embodiment of the present general inventive concept. The sensing unit 203 may have the camera C1 of FIG. 3 to have a first sensing center line SCL1 and a first sensing area SA1, and a camera C2 to have a second sensing center line C2 and a second sensing area SA2. The virtual plane VP may be disposed in an overlap area of the first sensing area SA1 and the second sensing area SA2. The virtual plane VP may be disposed between the first sensing center line SCL1 and the second sensing center line SCL2. The virtual area VA is disposed over the display area DA in a perpendicular direction within the overlap area. the virtual plane VP may be spaced apart from the display area DA by a distance d2. The distance d2 may also be adjustable according to an adjustably installation of the camera C1 and the camera C2.

Figure 5:
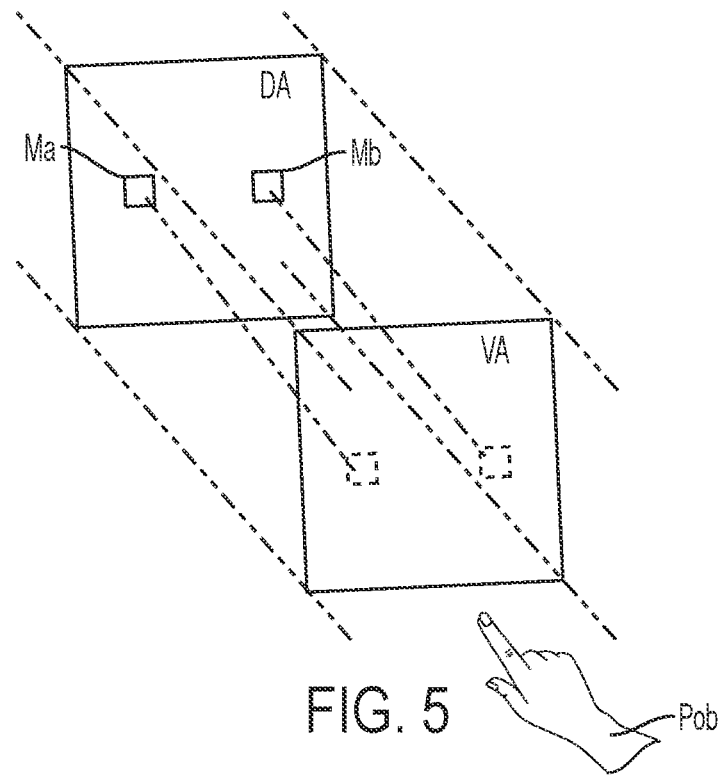
FIGS. 5 and 6 are views illustrating an object sensed by a sensing unit of an electronic apparatus according to an embodiment of the present inventive concept.
Figure 6:
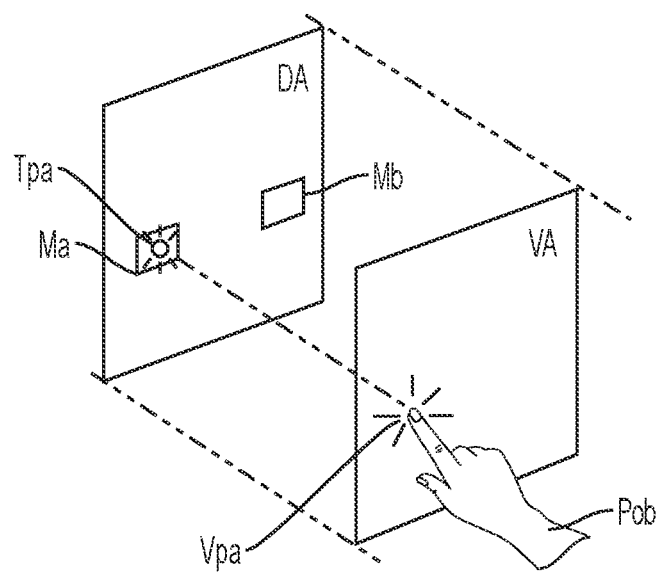

FIGS. 5 and 6 are views illustrating an object sensed by a sensing unit of an electronic apparatus according to an embodiment of the present inventive concept. One or more icons (or menus) Ma, Mb, . . . , Mn may be displayed on the display area DA. the virtual area VA is disposed over the display area in a perpendicular direction. When an object, for example, a user's finger Pob is disposed over the virtual area VA or moves toward or away from the virtual area VA. The sensing unit 203 senses the object disposed in the virtual area VA, and the controller 210 may determine whether a location (or position) of the object is disposed to correspond to one of the icons Ma, Mb, . . . , Mn of the display area DA.

When the controller 210 determines that the object is disposed at a location (or position) Vpa corresponding to the icon Ma of the display area DA, the controller 210 may determine that the icon Ma is selected so that a corresponding function of the icon Ma can be performed. The controller 210 may determine the presence or existence of the object in the virtual area VA as a user input. The object can be represented by a stationary object disposed at a position or a movable object movable between two positions. The controller 210 may control the input/output unit 204 to display a character or sign Tpa within the corresponding icon Ma of the display area DA to represent that the icon Ma is selected. It is possible that the icon Ma is highlighted or emphasized. The controller 210 processes the function corresponding to the user input and controls the input/output unit 204 to generate an output, for example, displaying an image corresponding to the processed function, communicating with other device, or transmitting or receiving data according to the processed function.

Since the display area DA includes a touch screen, the controller 210 may receive a user input from a touch input though the input/output unit 204 and/or a sensed object though the sensing unit 203. For example, a touch input on the icon MA of the display area DA and a sensed object in the virtual area are determined as a user input to control the electronic apparatus.

Figure 7:
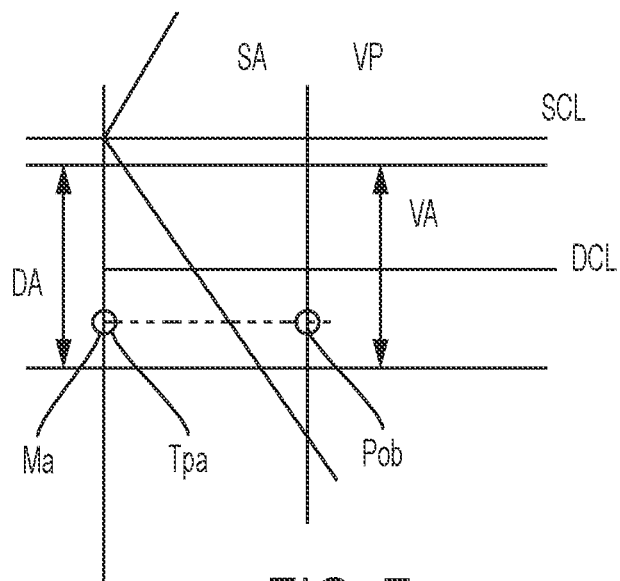
FIGS. 7 and 8 are views illustrating a point of a virtual area to correspond to a display point of a display area in an electronic apparatus according to an embodiment of the present inventive concept.
Figure 8:
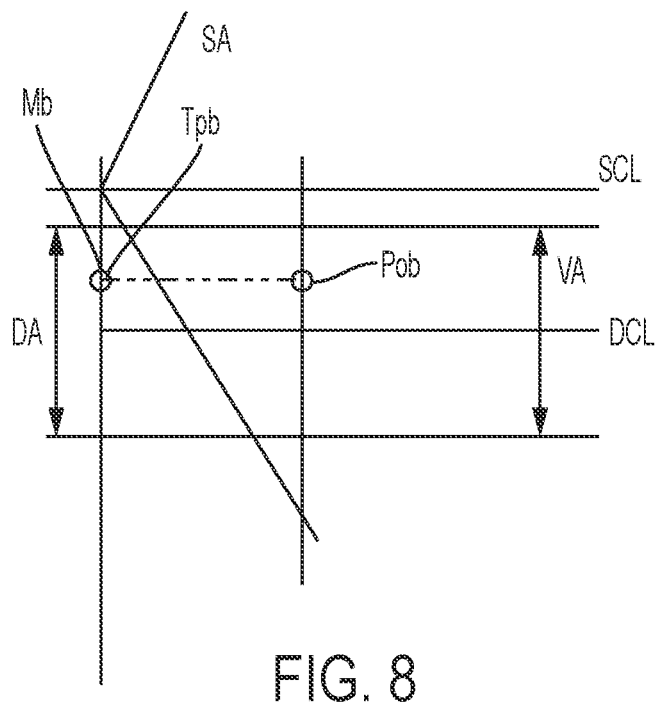

FIGS. 7 and 8 are views illustrating a point of a virtual area to correspond to a display point of a display area in an electronic apparatus according to an embodiment of the present inventive concept. An object, for example, a user finger Pob, moves toward or disposed at a position VPa or VPb with respect to a display center line DCL of the display area DA in the virtual area VA. The positions VPa and TPa of FIG. 7 are opposite to the positions VPb and TPb of FIG. 8 with respect to the display center line DCL of the display area DA. All of the positions VPa, VPb, TPa, TPb are disposed in a side of the sensing center line SCL of the sensing unit 203.

Figure 9:
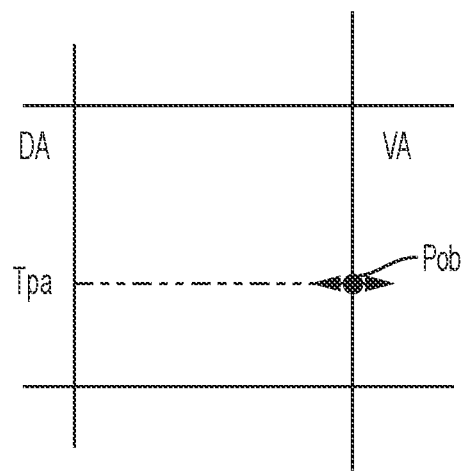
FIGS. 9 and 10 are views illustrating a status of an object corresponding to a virtual point with respect to a virtual area and a display area in an electronic apparatus according to an embodiment of the present inventive concept.
Figure 10:
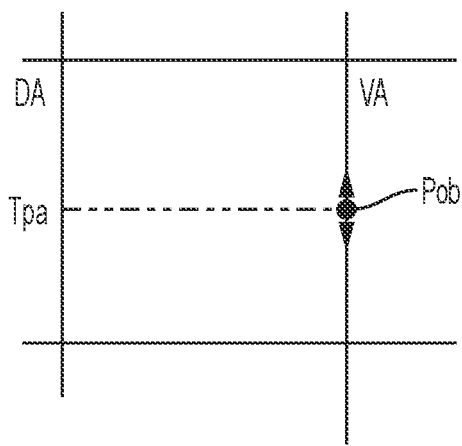

FIGS. 9 and 10 are views illustrating a status of an object corresponding to a virtual point with respect to a virtual area and a display area in an electronic apparatus according to an embodiment of the present inventive concept. When an object moves between two positions with respect to a position VPa in a first direction of FIG. 9 or in a second direction of FIG. 10, the controller 210 determines the presence, existence, or movement of the object as a user input to select the icon Ma, and then perform the corresponding function. Although FIGS. 9 and 10 illustrate two directions, the present general inventive concept is not limited thereto. The controller 210 may detect the movement of the object in a direction other than the two directions of FIGS. 9 and 10.

Figure 11:
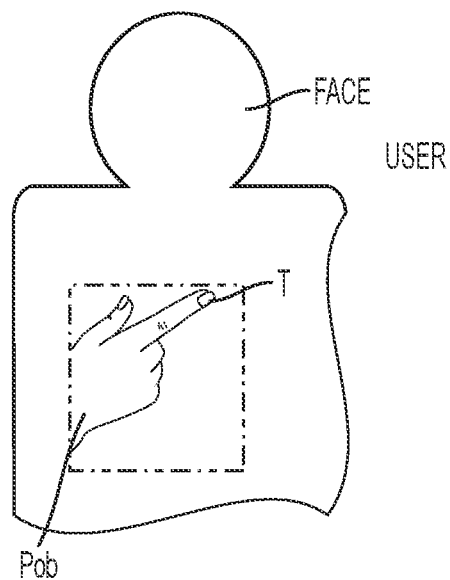
FIGS. 11 and 12 are views illustrating objects sensed by a sensing unit in an electronic apparatus according to an embodiment of the present inventive concept.
Figure 12:
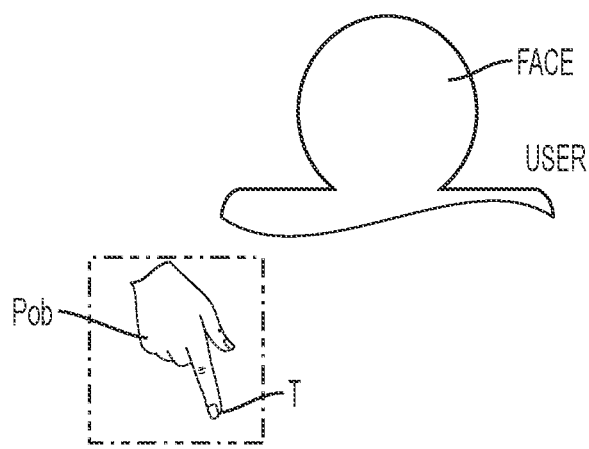

FIGS. 11 and 12 are views illustrating objects sensed by a sensing unit in an electronic apparatus according to an embodiment of the present inventive concept. When the sensing unit 203 senses two or more objects, the controller 210 may provide a priority to at least one of objects to determine a user input. For example, when there are two objects in the virtual area VA, the controller 210 may determine that a user finger Pob has a higher priority than a user face as a user input. It is also possible that a distal end T of the user finger Pob can have a higher priority than other portions of the user finger Pob as a user input. The user input can be determined according to the presence, existence, and movement of the distal end T in the virtual area.

Figure 13:
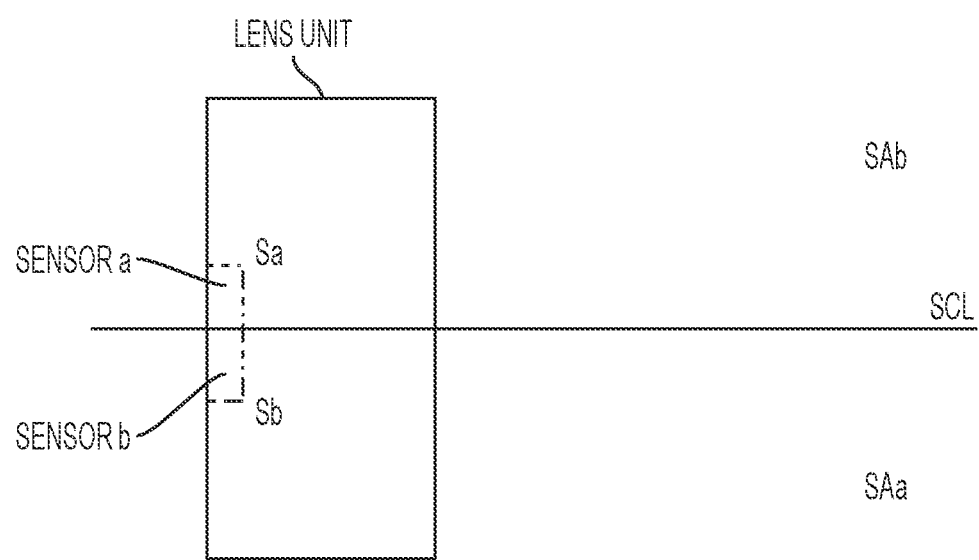
FIG. 13 is a view illustrating a location of a sensing unit in an electronic apparatus according to an embodiment of the present inventive concept.
Figure 14A:
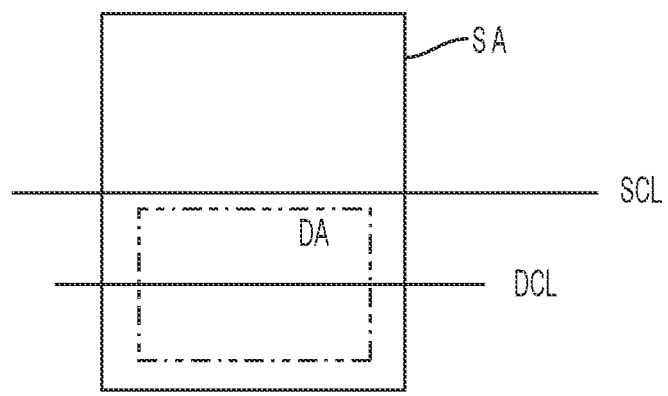
FIGS. 14A, 14B, 15A, and 15B are views illustrating a virtual area of a sensing unit and a display area of a display unit according to an embodiment of the present inventive concept.
Figure 14B:
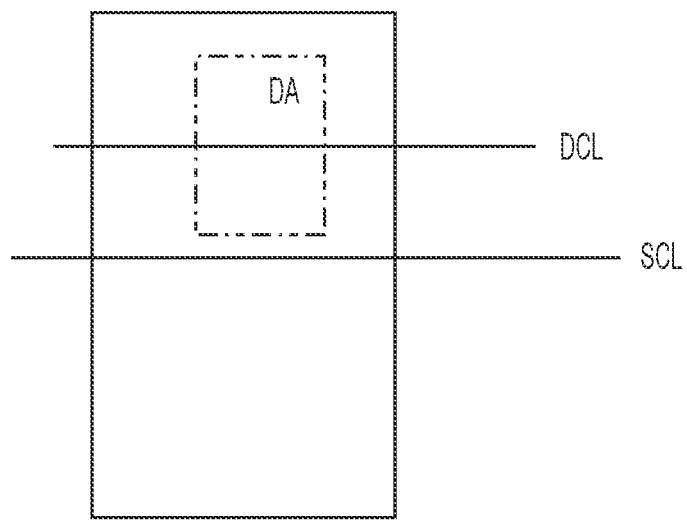
Figure 15A:
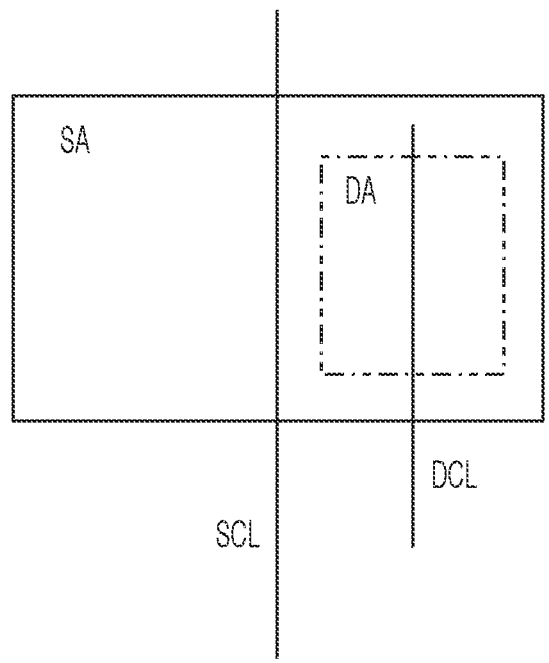
Figure 15B:
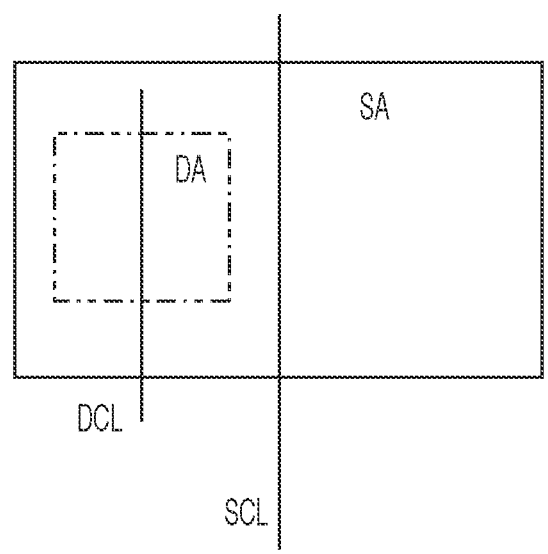

FIG. 13 is a view illustrating a location of a sensor of a sensing unit in an electronic apparatus according to an embodiment of the present inventive concept. The sensing unit may be a camera having a lens unit, and the lens unit may have a photographing angle to define a sensing area SA and a sensing center line SCL disposed at a center of the sensing area SA. The sensing area SA may have two sensing areas SAa and SAb which are disposed opposite to each other with respect to the sensing center area SCL. The lens unit may have a sensor which may not disposed at a center area but disposed at a side Sa or Sb with respect to the sensing center line SCL to sense one of the two sensing areas SAa and SAb. In this case, one of the two sensing areas SAa and SAb may not be sensed by the sensor disposed at the side.

FIGS. 14A, 14B, 15A, and 15B are views illustrating a virtual area of a sensing unit and a display area of a display unit according to an embodiment of the present inventive concept. The virtual area VA to detect an object as a user input is disposed at one side of the sensing area SA, for example, the virtual plane VP, with respect to the sensing center line SCL. The sensing area SA and the display area DA are illustrated in a vertical direction in FIGS. 14A and 14B and in a horizontal direction in FIGS. 15A and 15B, according to a location of the sensing unit with respect to the display area DA.

Figure 16:
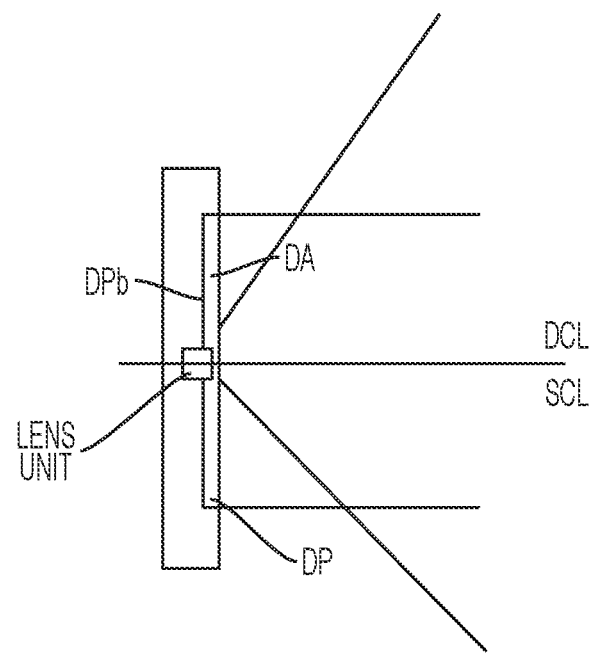
FIG. 16 is a view illustrating a location of a sensing unit in an electronic apparatus according to an embodiment of the present inventive concept.

FIG. 16 is a view illustrating a location of a sensing unit in an electronic apparatus according to an embodiment of the present inventive concept. The sensing unit may be disposed at a center of the display area DA or at a position on the display center line DCL and/or the sensing center line SCL. The lens unit may be disposed at a bottom DPb of a display panel (touch panel) DP. The display panel DP may be a liquid crystal device (LCD) having a screen corresponding to the display area DA, a circuit element to form an image to be displayed on the screen, and a light element to generate light toward the circuit element. The sensing unit may be disposed at a center of the LCD. In this case, the LCD may provide a transparent condition to a portion corresponding to the sensing unit such that the sensing unit senses the object through the LCD. The light element may have a portion corresponding to the sensing unit to prevent interference with the sensing operation of the sensing unit. The display panel DP may be formed with an LED unit having a number of LEDs. In this case, the LED unit may have a portion without an LED to prevent interference with the operation of the sensing unit.

Figure 17:
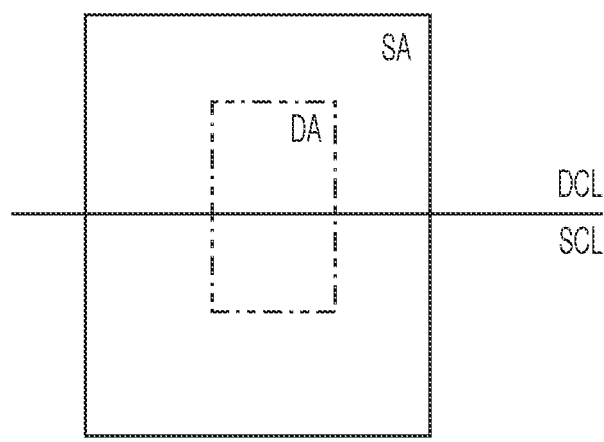
FIG. 17 is a view illustrating a virtual area of a sensing unit and a display area of a display unit according to an embodiment of the present inventive concept.

FIG. 17 is a view illustrating a virtual area of a sensing unit and a display area of a display unit according to an embodiment of the present inventive concept. When the sensing unit is disposed at the center of the display area DA, the virtual area VA is disposed in the display area DA, and the sensing center line SCL and the display center area SCL are identical to each other.

Figure 18A:
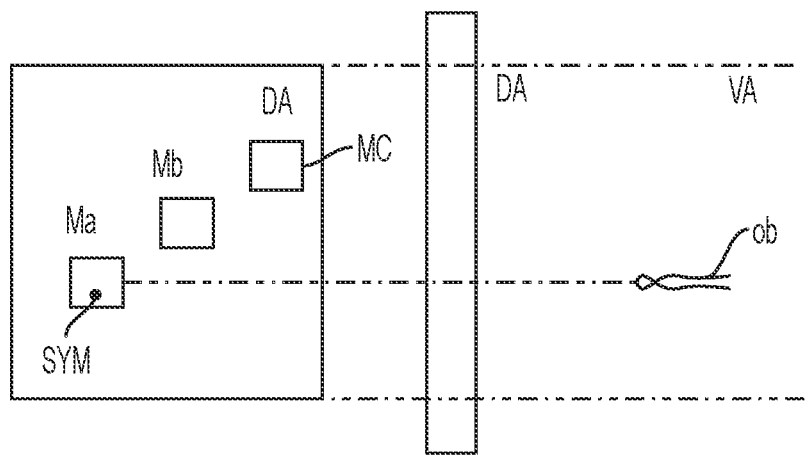
FIGS. 18A and 18B are views illustrating a virtual point displayed on a display area of a display unit in an electronic apparatus according to an embodiment of the present inventive concept.
Figure 18B:
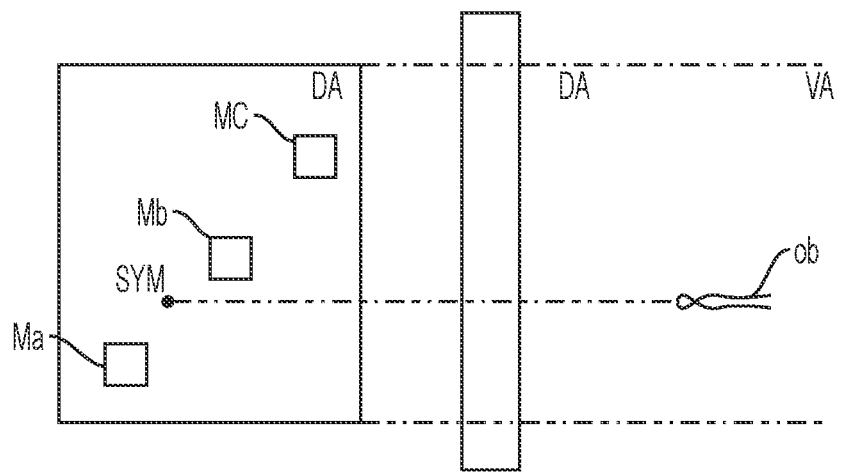

FIGS. 18A and 18B are views illustrating a virtual point displayed on a display area of a display unit in an electronic apparatus according to an embodiment of the present inventive concept. When an object Ob is sensed to correspond to one of icons Ma, Mb, and Mc, a symbol SYM is displayed at the corresponding icon Ma, Mb, or MC on the display area DA, as illustrated in FIG. 18A. The symbol SYM representing the sensed object may be disposed at a center portion or a side portion of an area of the corresponding icon Ma, Mb, and Mc. When the object is sensed to be disposed at a portion which does not correspond to one of the icons Ma, Mb, and Mc, it is possible that a symbol SYM may be displayed at a point outside the icons MA, Mb, or Mc, as illustrated in FIG. 18B. The symbol SYM may be a dot, a flash, a brink, or a sign. However, the present general inventive concept is not limited thereto. The symbol may be a characteristic change of the corresponding one of the icons Ma, Mb, and MC while the other icons do not show any characteristic change.

Figure 19:
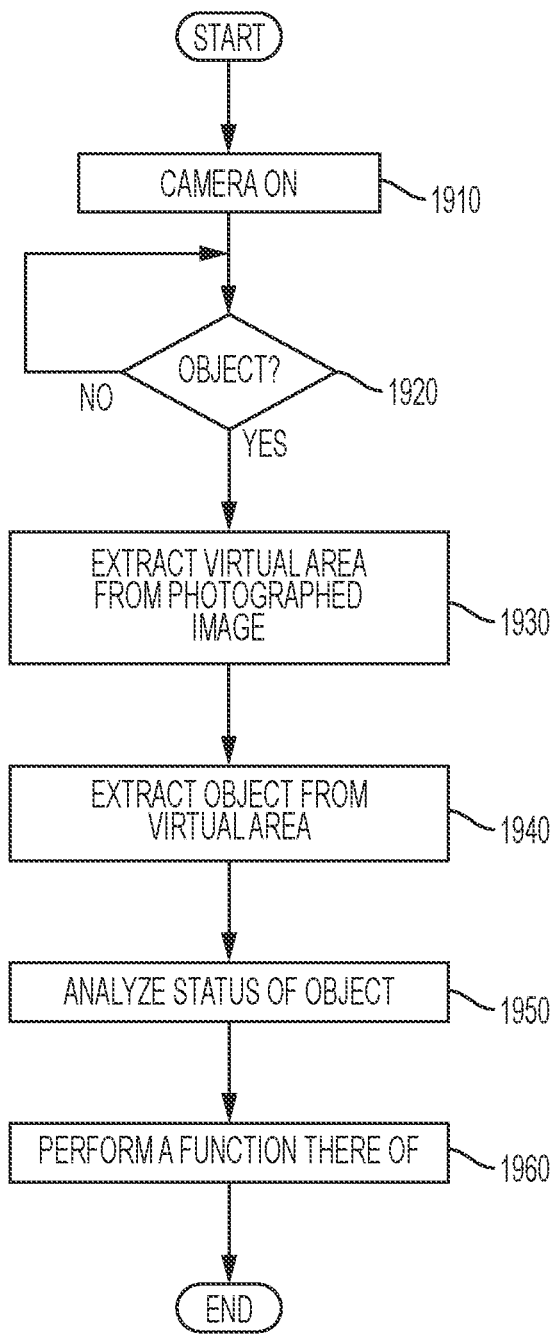
FIGS. 19 and 20 are flowcharts illustrating a method of inputting a user command using a sensing unit in an electronic apparatus according to an embodiment of the present inventive concept.
Figure 20:
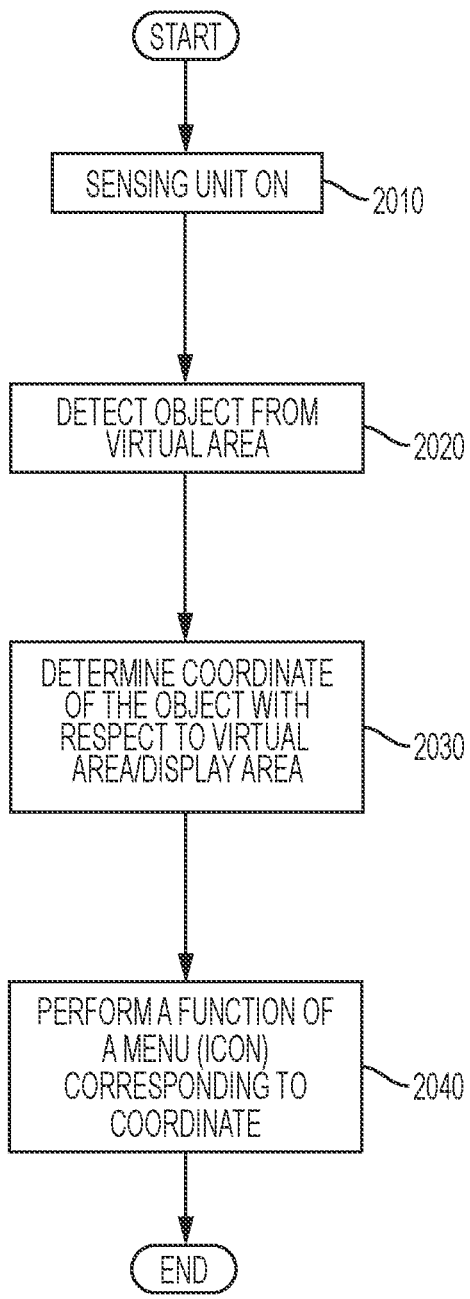

FIGS. 19 and 20 are flowcharts illustrating a method of inputting a user command using a sensing unit in an electronic apparatus according to an embodiment of the present inventive concept.

Referring to FIG. 19, when a sensing unit, for example, a camera, is turned on, activated, or starts one of functions thereof in operation 1910, an object exists in the photographed image in operation 1920. A virtual area is extracted from the photographed image in operation 1930. An object is extracted from the virtual area in operation 1940. The status of the object is analyzed and determined as a user input when the object is disposed at a position corresponding to an icon displayed on a display area in operation 1950. A function corresponding to the icon is performed in operation 1960.

Referring to FIG. 20, when a sensing unit, for example, a camera, is turned on, activated, or starts one of functions thereof in operation 2010, an object is detected from a virtual area corresponding to a display area in operation 2020. A coordinate of the virtual area corresponds to a coordinate of the display area. When a position of the object with respect to the coordinate of the virtual area corresponds to a position of an icon with respect to the coordinate of the display area, it is determined that the presence, existence, or movement of the object is a user input in operation 2030. A function of the icon is performed in operation 2040.

Figure 21:
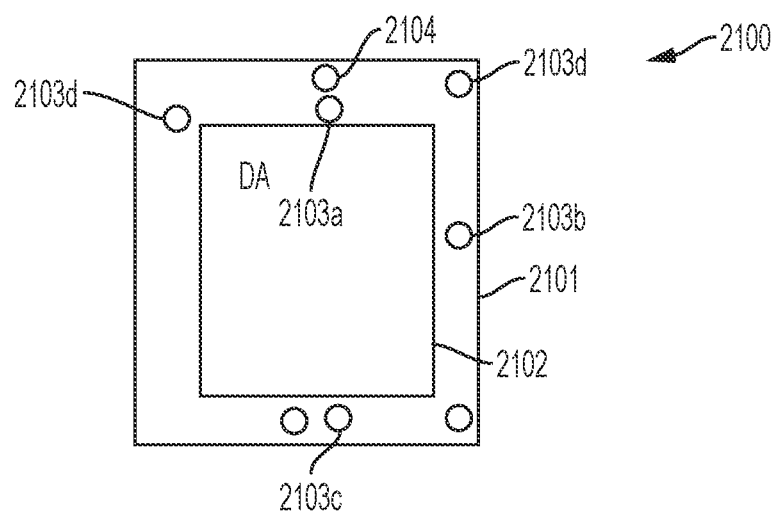
FIG. 21 is a view illustrating a location of a sensing unit in an electronic apparatus according to an embodiment of the present inventive concept.

FIG. 21 is a view illustrating a location of a sensing unit in an electronic apparatus 2100 according to an embodiment of the present inventive concept. The sensing unit may be one or more sensing elements disposed positions 2103a, 2103b, 2013c, and 2103d around a display area DA of a display panel 2102 on a housing 2101. When one or more cameras are included in the sensing unit, the cameras may be installed at positions 2104 and at least one of the positions 2103a, 2103b, 2013c, and 2103d. It is possible that the sensing element and the camera may be same to photograph an object as a photographing mode and to sense an object as a user input with respect to the display area DA in a sensing mode. Accordingly, the camera can be usable in one of the photographing mode and the sensing mode or also usable in both the photographing mode and the sensing mode at the same time. In this case, an image corresponding to the photographed object has a center corresponding to the sensing center line SCL, and an image corresponding to the sensed object in the virtual area VA may have a center corresponding to the display center line SCL. When the object disposed at a position on the display center line DCL is photographed and displayed at a position different from the display center line DCL. However, when the object disposed at a position on the display center line DCL is sensed and analyzed to be disposed at a position on the display center line SCL according to coordinates of the display area DA and the virtual area VA.

Figure 22:
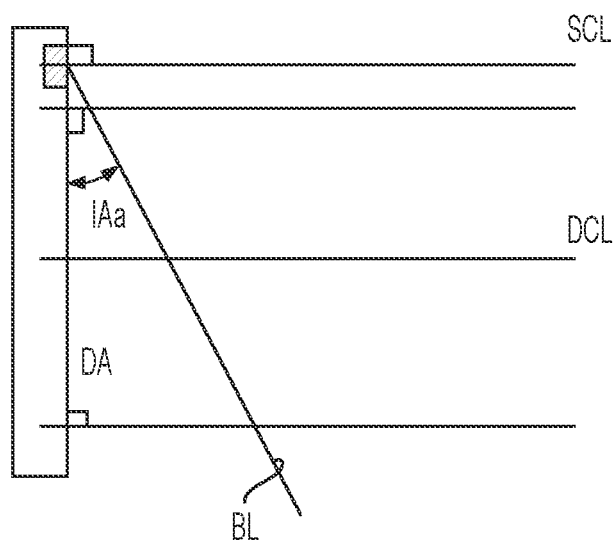
FIGS. 22 and 23 are views illustrating an electronic apparatus having a sensing unit installed thereon according to an embodiment of the present general inventive concept.
Figure 23:
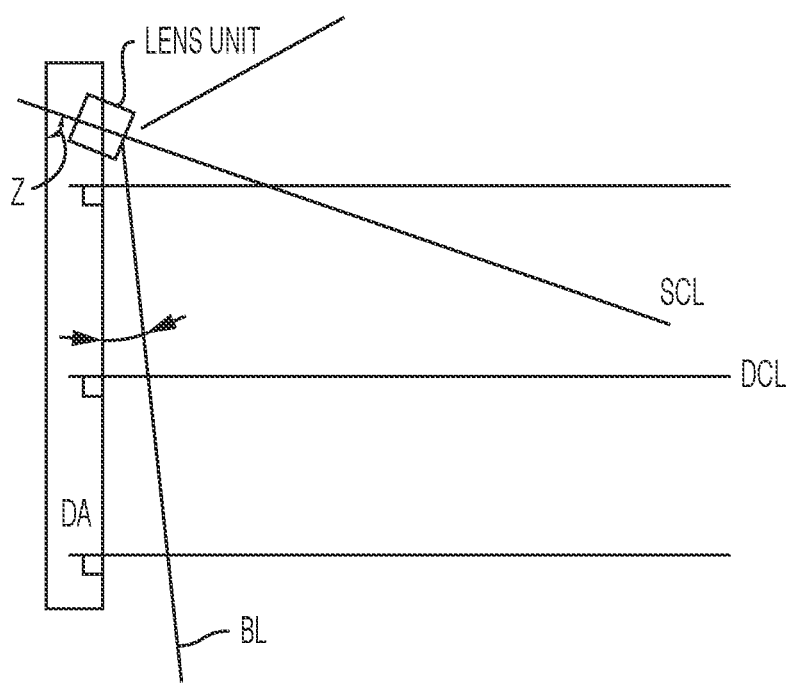

FIGS. 22 and 23 are views illustrating an electronic apparatus having a sensing unit installed thereon according to an embodiment of the present general inventive concept. FIG. 22 illustrates that a sensing unit is installed at a side of the display area DA such that a sensing center line SCL is perpendicular to the display area DA and a boundary line BL is inclined to spaced apart from the display area according to a distance from the sensing center line SCL or the sensing unit. FIG. 23 illustrates that a sensing unit is installed at a side of the display area DA such that a sensing center line SCL is not perpendicular to the display area DA. The sensing unit may be installed such that a boundary line BL can be substantially parallel to the display area DA. However, the present general inventive concept is not limited thereto. The boundary line BL may be spaced apart from the display area DA by a distance so that the sending unit can sense a user finger or tool disposed adjacent to the display area DA. The sensing unit may have a sub-housing with a lens unit having the sensing center line SC, and the sub-housing may be installed in the sub-housing at an inclination angle with a plane of the display area DA. A method of installing a sensing unit on a housing is well known, detail description thereof is omitted. It is possible that the boundary line BL of FIG. 23 may be inclined with respect to the display area DA. In this case, an inclination angle IAb of the boundary line BL of FIG. 23 is smaller than an inclination angle IAa of the boundary line BL of FIG. 22. A hatched portion is a virtual area of a sensing area disposed above the display area DA in a direction perpendicular to the display area DA.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include a semiconductor device, a read-only memory (ROM), a random-access memory (RAM), a flash memory, a semiconductor chip package, CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

As described above and also illustrated in the drawings, a user may input a user command on a virtual area corresponding to a display area without touching the display area in an electronic apparatus according to an embodiment of the present inventive concept. Also, the virtual area may be spaced apart from the display area, disposed parallel to the display area, and disposed to overlap the display area in a vertical direction from the display area in the electronic apparatus such that an object can be sensed to correspond to the same point in the virtual area and the display area in the vertical direction according to an embodiment of the present general inventive concept.

Moreover, as described above and also illustrated in the drawings, the electronic apparatus may include a housing, a display unit installed in the housing and having a display area to display an image or a menu icon, a sensing unit installed in the housing adjacent to the display unit, and having a virtual area to sense an object which is disposed over the display area of the display unit, the virtual area defined by a boundary extended from the display area in a direction perpendicular to the display area, and a controller to analyze status of the object according to an original state of the object and a sensed state of the object, and to determine the analyzed status of the object as a user input.

The original state of the object and the sensed state of the object with respect to the display area may be different from each other according to a difference between center lines of the sensing unit and the display area of the display unit.

The controller may adjust the sensed state of the object to the original state of the object with respect to the display area to determine whether the status of the object corresponds to the user input to the display area.

The controller may control the display unit to display a symbol representing the status of the object with respect to the display area.

The symbol may be displayed on the menu icon or outside the menu icon in the display area according to a location of the status of the object with respect to the display area.

The virtual area and the display area may overlap in the boundary in the perpendicular direction.

The menu icon may be disposed in the display area, and the object may be disposed in the virtual area to correspond to the menu icon of the display area.

The sensing unit may have a sensing area with a sensing center line and the display area has a display center line which is spaced apart from the sensing center line by a distance.

The virtual area may be disposed in a side of the sensing area with respect to the sensing center line, and the controller may extract the virtual area from the sensing area.

When the object moves a first distance in a first direction within the virtual area, the sensing unit may sense the object moving a second distance in a second distance since a sensing center line of the sensing unit is not a center line of the virtual area, and the controller may analyze the status of the object according to differences between the first and second distances and between the first and second distances and determines the status of the object as the user input with respect to the display area.

When the object moves toward a first position of the display area, the sensing unit may sense the object moving toward a second position of the display area in the virtual area, the second position being different from the first position. The controller may adjust the second position to the first position with respect to the display area.

The sensing unit may sense the object at a first position with respect to the virtual area, and the controller may convert the sensed first position into a second position with respect to the display area as the status of the object and determines the status of the object as the user input.

The display area and the virtual area may have a same coordinate, the sensing unit may sense the object in the coordinate of the virtual area, and the controller may determine the status of the object as the user input from the sensed object according to the coordinate of the display area.

The virtual area is disposed to overlap the display area in a vertical direction from the display area, and the controller may determine whether the status of the sensed object of the virtual area corresponds to the menu icon of the display area, and also determine the status of the sensed object as the user input of the menu icon to perform a function of the menu icon.

The sensing unit may sense one or more sub-objects, and the controller may determine one of the one or more sub-objects as the object.

The sensing unit may sense a user face and a user finger, and the controller may determine the user finger as the object.

The sensing unit may sense a user finger as the object, and the controller determines a distal end of the user finger as the status of the object.

The sensing unit may have a sensing center line to have an angle with a display center line of the display area, and the sensing center line of the camera may not be parallel to the display center line of the display area.

The sensing unit may be a camera having a photographing area to photograph the object. The controller may extract from the photographing area the virtual area including the object disposed over the display area, and may also determine from the photographed image that the object is disposed over the menu icon in a direction perpendicular direction from the display area.

The display unit may be a touch panel usable as an output unit to display the image or the menu icon and an input unit to receive the user input to control the image or the menu icon. The sensing unit may include a lens unit with a sensing area in which the virtual area and a non-virtual area are included, and the lens unit includes a sensor to photograph the virtual area.

The display unit may include a display panel having the display area, and the sensing unit is disposed at a bottom area of the display panel of the display unit.

Furthermore, as described above and also illustrated in the drawings, The electronic apparatus may include a housing, a display unit installed in the housing, and having a display area usable as an output unit to display an image or a menu icon and an input unit to receive a user input to control a function of the electronic apparatus including the image or the menu icon, a sensing unit installed in the housing adjacent to the display unit, and having a camera with a photographing area including a virtual area to sense an object which is disposed over the display area of the display unit, the virtual area defined by a boundary extended from the display area in a direction perpendicular to the display area, and a controller to analyze status of the object according to an original state of the object and a sensed state of the object, and to determine the analyzed status of the object as the user input.

Furthermore, as described above and also illustrated in the drawings, the electronic apparatus may perform a method including providing a housing with a display unit having a display area to display an image or a menu icon, and a sensing unit installed adjacent to the display unit and having a virtual area to sense an object which is disposed over the display area of the display unit, the virtual area defined by a boundary extended from the display area in a direction perpendicular to the display area, and analyzing status of the object according to an original state of the object and a sensed state of the object, and determining the analyzed status of the object as a user input.

Furthermore, as described above and also illustrated in the drawings, the present general inventive concept may be implemented as a computer-readable medium to contain computer-readable codes as a program to perform the method described above in the electronic apparatus.

Although a few exemplary embodiments of the present general inventive concept have been shown and described, it will be appreciated by those skilled in the art that changes may be made in these exemplary embodiments without departing from the principles and spirit of the general inventive concept, the scope of which is defined in the appended claims and their equivalents.

What is claimed is:

1. A panel usable with a cell phone having a housing, a network interface, and a user interface, the panel comprising:
   a display panel comprising light elements to display an image; and
   a touch panel disposed on the display panel to receive a touch input,
   wherein the panel comprises a first portion and a second portion, the second portion being in the first portion and having a transparent condition such that a camera of the cell phone is in the second portion.

2. The panel of claim 1, wherein the second portion is formed in the display panel.

3. The panel of claim 1, wherein the first portion and the second portion are parallel to each other within the panel.

4. The panel of claim 1, wherein the second portion is formed in the first portion in a thickness direction of the panel.

5. The panel of claim 1, wherein the second portion is smaller than the first portion with respect to a display area of the panel.

6. The panel of claim 1, wherein the second portion is surrounded by the first portion.

7. The panel of claim 1, wherein the camera of the cell phone comprises a lens, and the lens is not outside the second portion.

8. The panel of claim 1, wherein the camera of the cell phone is not outside the second portion.

9. The panel of claim 1, wherein the first portion includes the light elements, and the second portion does not include the light elements.

10. The panel of claim 1, wherein the first portion comprises a liquid crystal device.

11. The panel of claim 1, wherein the first portion comprises a light emitting device.

12. The panel of claim 1, wherein the first potion comprises a first number of light elements, and the second portion comprises a second number of light elements.

13. The panel of claim 1, wherein the first portion comprises a circuit element and a light element.

14. The panel of claim 1, wherein the transparent condition further comprises an interference-prevention condition to prevent the camera of the cell phone from being interfered during photographing.

15. The mobile device of claim 1, wherein the transparent condition prevents the camera of the cell phone from being interfered during sensing.

16. A cell phone comprising:
    a housing;
    a network interface;
    a user interface comprising a panel comprising a display panel comprising light elements to display an image, and a touch panel disposed on the display panel to receive a touch input, wherein the panel comprises a first portion and a second portion, the second portion being in the first portion and having a transparent condition, and
    a camera being in the second portion to photograph an object over the panel through the second portion.

17. The cell phone of claim 16, further comprising:
    a control unit to control the network interface and the user interface, and to control the cameras to perform a photographing mode to photograph the object,
    wherein the photographed object is displayed on the panel.

18. The cell phone of claim 16, further comprising:
    a control unit to control the network interface and the user interface, and to control the camera to perform a sensing mode to sense the object to perform a function,
    wherein the sensed object is not displayed on the panel.

19. The cell phone of claim 16, further comprising:
    a control unit to control the network interface and the user interface, and to control the camera to selectively perform a sensing mode to sense the object to perform a function and a photographing mode to photograph the object,
    wherein the sensed object is not displayed on the panel, and the photographed object is displayed on the panel.

20. The cell phone of claim 16, wherein the second portion is formed in the display panel.

21. The cell phone of claim 16, wherein the first portion and the second portion are parallel to each other within the panel.

22. The cell phone of claim 16, wherein the second portion is formed in the first portion in a thickness direction of the panel which is perpendicular to a display area of the panel.

23. The cell phone of claim 16, wherein the second portion is smaller than the first portion with respect to a display area of the panel.

24. The cell phone of claim 16, wherein the second portion is surrounded by the first portion.

25. The cell phone of claim 16, wherein the camera comprises a lens, and the lens is not outside the second portion.

26. The cell phone of claim 16, wherein the camera is not outside the second portion.

27. The cell phone of claim 16, wherein the camera is at a bottom of the second portion of the panel to photograph an object above the panel through the second portion of the panel.

28. The cell phone of claim 16, wherein the first portion includes the light elements, and the second portion does not include the light elements.

29. The cell phone of claim 16, wherein the first portion comprises a liquid crystal device.

30. The cell phone of claim 16, wherein the first portion comprises a light emitting device.

31. The cell phone of claim 16, wherein the first potion comprises a first number of light elements, and the second portion comprises a second number of light elements.

32. The cell phone of claim 16, wherein the first portion comprises a circuit element and a light element.

33. The cell phone of claim 16, wherein the transparent condition further comprises an interference-prevention condition to prevent the camera from being interfered during photographing the object.

34. The cell phone of claim 16, wherein the transparent condition prevents the camera from being interfered during sensing the object.

35. The cell phone of claim 16, wherein the camera comprises one or more cameras in the second portion of the panel.

36. The cell phone of claim 16, wherein the camera comprises one or more cameras in the second portion of the panel, and the control unit selectively controls the one or more cameras to perform a photographing mode to photograph the object and a sensing mode to sense the object to perform a function.

\* \* \* \* \*